United States Patent [19]

Looman

[11] Patent Number: 5,679,143

[45] Date of Patent: Oct. 21, 1997

[54] BLEED ALLEVIATION IN INK JET INKS USING ACIDS CONTAINING A BASIC FUNCTIONAL GROUP

[75] Inventor: Steven D. Looman, Corvallis, Oreg.

[73] Assignee: Hewlett-Packard Company, Palo Alto, Calif.

[21] Appl. No.: 741,073

[22] Filed: Oct. 30, 1996

Related U.S. Application Data

[63] Continuation-in-part of Ser. No. 567,974, Dec. 6, 1995.

[51] Int. Cl.$^6$ .................................................... C09D 11/02
[52] U.S. Cl. .................... 106/20 R; 106/22 R; 106/22 D; 106/22 H; 106/22 K; 106/20 D
[58] Field of Search ................... 106/20 R, 20 D, 106/22 R, 22 D, 22 H, 22 K

[56] References Cited

U.S. PATENT DOCUMENTS

| | | | |
|---|---|---|---|
| 4,201,303 | 5/1980 | Stoffel et al. | 106/20 R |
| 5,181,045 | 1/1993 | Shields et al. | 346/1.1 |
| 5,198,023 | 3/1993 | Stoffel | 106/22 R |
| 5,320,668 | 6/1994 | Shields et al. | 106/22 R |
| 5,476,540 | 12/1995 | Shields et al. | 106/20 R |
| 5,518,534 | 5/1996 | Pearlstine et al. | 106/22 R |
| 5,531,817 | 7/1996 | Shields et al. | 106/22 R |
| 5,534,051 | 7/1996 | Lauw | 106/22 R |
| 5,536,306 | 7/1996 | Johnson et al. | 106/22 R |
| 5,555,008 | 9/1996 | Stoffel et al. | 106/20 D |

*Primary Examiner*—Helene Klemanski

[57] ABSTRACT

A pH adjusting organic compound having both at least one acid functional group and at least one basic functional group is employed along with an organic acid having no basic functional groups in a first ink-jet ink composition to reduce the pH differential required to render insoluble the pH-sensitive colorant of a second encroaching ink-jet ink composition. By inducing the precipitation of the pH-sensitive colorant, migration of the colorant is inhibited, thereby substantially reducing bleed between the pH-sensitive ink and the ink containing the organic acid (the "target" ink). By employing an organic acid in the practice of the invention, a pH differential on the order of only 3 to 5 units may be required. Aside from increasing the pH of the ink to desirable levels, the pH adjusting organic compound enhances bleed control by increasing the concentration of acid functional groups beyond the amount provided by the organic acid component. The organic acid component is employed at a concentration ranging from about 0.1 to 20 wt % and may be represented by such acids as polyacrylic, acetic, glycolic, malonic, malic, maleic, ascorbic, succinic, glutaric, fumaric, citric, tartaric, lactic, sulfonic, and orthophosphoric acid and derivatives thereof. The pH adjusting organic compound is employed in sufficient amount (about 0.1 to 20 wt %) to achieve the desired pH differential and typically comprises an amino acid.

27 Claims, 1 Drawing Sheet

BLEED ALLEVIATION IN INK JET INKS USING ACIDS CONTAINING A BASIC FUNCTIONAL GROUP

CROSS-REFERENCE TO RELATED APPLICATION

The present application is a continuation-in-part of co-pending application Ser. No. 08/567,974, filed on Dec. 6, 1995.

TECHNICAL FIELD

The present invention relates to ink-jet printing, especially in thermal ink-jet printing, and, more particularly, to the reduction or elimination of bleed between black and color ink compositions printed adjacent to one another.

BACKGROUND ART

Ink-jet printing is a non-impact printing process in which droplets of ink are deposited on a print medium in a particular order to form alphanumeric characters, area fills, and other patterns thereon. Low cost and high quality of the output, combined with relatively noise-free operation, have made ink-jet printers a popular alternative to other types of printers used with computers.

The non-impact printing process of ink-jet printing involves the ejection of fine droplets of ink onto a print media such as paper, transparency film, or textiles in response to electrical signals generated by a microprocessor. There are two basic means currently available for achieving ink droplet ejection in ink-jet printing: thermally and piezo-electrically. In thermal ink-jet printing, the energy for drop ejection is generated by electrically heated resistor elements, which heat up rapidly in response to electrical signals from a microprocessor to create a vapor bubble, resulting in the expulsion of ink through nozzles associated with the resistor elements. In piezoelectric ink-jet printing, the ink droplets are ejected due to the vibrations of piezoelectric crystals, again, in response to electrical signals generated by the microprocessor.

In commercially-available thermal ink-jet color printers, such as a DeskJet® printer available from Hewlett-Packard Company, a color spectrum is achieved by combining yellow, magenta, and cyan inks in various proportions. A four-pen set is typically employed in such printers to achieve the necessary color combinations. The yellow, magenta, and cyan inks derive their hues from yellow, magenta, and cyan colorants, respectively.

Colorants for inks are available in the form of dyes or pigments. Accordingly, ink-jet inks are available as either dye-based or pigment-based compositions. Of the two, dye-based ink-jet ink compositions are much more widely available. Dye-based ink-jet ink compositions are generally aqueous-based and are formulated by dissolving dye in an ink vehicle. The dye molecules employed in ink-jet ink compositions are often in the form of dye salts made of a dye anion and a cation such as sodium or tetramethylammonium (TMA). A limited number of pigment-based ink-jet inks are also available, which generally comprise a pigment dispersed in an aqueous solution by a dispersant. Although pigments offer the very desirable properties of waterfastness and lightfastness, their natural tendency to agglomerate in aqueous media and their lack of uniform size distribution have dampened industry enthusiasm for their employment as ink-jet ink compositions in comparison to dye-based inks.

Regardless of whether an ink is dye-based or pigment-based, ink-jet inks are commonly plagued by the occurrence of bleed. The term "bleed", as used herein, is defined to be the invasion of one color into another, as evidenced by a ragged border therebetween. Bleed occurs as colors mix both on the surface of the paper substrate as well as within the substrate itself. The occurrence of bleed is especially problematic between a black ink and an adjacently-printed color ink because it is all the more visible. Hence, to achieve good print quality, bleed must be substantially reduced or eliminated such that borders between colors are clean and free from the invasion of one color into the other.

Various solutions to the problem of black to color and color to color bleed have been proffered. Some solutions involve changing the ink environment to reduce bleed. For instance, heated platens and other heat sources, along with specially-formulated paper, have been employed to reduce bleed. However, heated platens add cost to the printer, and specially formulated paper is more expensive than "plain" paper. Thus, using external paraphernalia to reduce bleed in thermal ink-jet color printing is generally not cost effective.

Other proposed solutions involve changing the composition of a thermal ink-jet ink to reduce bleed. For example, surfactants have been used to increase the penetration rate of the ink into the paper. However, increasing the penetration rate in this fashion may also reduce edge acuity. A solution to the specific problem of black to yellow color bleed is disclosed in U.S. Pat. No. 5,198,023, issued Mar. 30, 1993 and assigned to the same assignee as the present invention, wherein multivalent cations such as calcium (as chloride) and magnesium (as chloride) are added at concentrations ranging from about 1 to 10 wt % to yellow cationic aqueous-based inks to prevent bleed between yellow and black inks. However, it has been determined that the addition of large amounts of multivalent cations to thermal ink-jet ink compositions may induce precipitation of dye salts, requiring further adjustments in the ink composition (see, e.g., U.S. Pat. No. 5,534,05, issued Jul. 9, 1996, to Hiang P. Lauw, entitled "Specific Dye Set for Thermal Ink-Jet Printing", and assigned to the same assignee as the present invention).

Another method of reducing bleed between ink-jet inks involves the use of pH-sensitive dyes as disclosed in U.S. Pat. No. 5,181,045 (hereafter Shields et al '045) entitled "Bleed Alleviation Using pH-Sensitive Dyes", issued Jan. 19, 1993, and assigned to the same assignee as the present invention. It is disclosed therein that an ink having a pH-sensitive dye would be prevented from bleeding into an adjacent ink having an appropriate pH. More particularly, migration of the ink having the pH-sensitive dye is prevented by rendering the dye insoluble on the page by contact with the pH of the adjacent ink. Thus, bleed is reduced or eliminated by using both the "pH-sensitive" ink as well as the "target" ink. Typically, since the invasion of a black dye into a color ink is more problematic than vice versa because of its greater visibility, the black ink would employ a pH-sensitive dye and the pH of the color ink would be controlled in the practice of the invention, such that the black ink would be prevented from bleeding into the color ink. The method of '045 requires a pH differential of about 4 (or even 5) units to completely control bleed. Accordingly, a pH not exceeding about 4 would be required to effectively eliminate bleed from a pH-sensitive ink having a typical pH of about 8.

However, subsequent to the disclosure of Shields et al '045, demands on printer performance have increased. Printers are expected to perform faster and at ever increasing levels of throughput. Consequently, merely controlling the pH of an ink per Shields et al '045 may no longer be effective in controlling bleed. Rather, a larger pH differential than 4 units appears necessary to control bleed in many situations. Thus, for a pH-sensitive black ink having a pH of about 8, the pH of the "target" color ink would necessarily be adjusted to less than about 3 to achieve bleed control, compared to the pH of 4 disclosed by Shields et al '045. Such low pH conditions create a harsh ink environment that may induce corrosion of the ink-jet pen as well as give rise to compatibility problems between ink components.

Related application Ser. No. 08/567,974, which was filed Dec. 6, 1995, discloses the use of organic acids to reduce the pH differential required to effect precipitation of a pH-sensitive colorant. Specifically, an ink-jet ink composition is provided therein which includes an organic acid at a concentration ranging from about 0.5 to 20 wt % of the ink-jet ink composition. The presence of the organic acid in the ink-jet ink reduces the pH differential required to render insoluble the pH-sensitive colorant of a second encroaching ink, a.k.a. the pH-sensitive ink. It would be desirable to further increase the amount of the acid functional group in the ink-jet ink composition, thereby achieving incrementally greater bleed control. However, the pH of the ink-jet ink must not be so low that a harsh, corrosive ink environment is induced.

Therefore, a need exists for a means to increase the amount of organic acid functional groups in a "target" ink-jet ink composition without simultaneously decreasing the pH of the ink-jet ink to an undesirably low level.

DISCLOSURE OF INVENTION

In accordance with the invention, an ink-jet ink composition and method for reducing bleed are provided which effect precipitation of a pH-sensitive colorant contained in an adjacently printed ink-jet ink composition using a narrower pH differential than that disclosed by Shields et al '045. More specifically, an ink-jet ink composition is provided which includes both (1) an organic acid having no basic functional groups and (2) a pH adjusting organic compound containing both acidic and basic functional groups, specifically, at least one acidic functional group and at least one basic functional group, where the number of basic functional groups is the same as or greater than the number of acidic functional groups. For convenience of discussion, the ink containing the organic acid component and the pH adjusting component is referred to hereafter as the "target" ink, while the ink containing the pH-sensitive colorant is referred to as the "pH-sensitive" ink.

The presence of the organic acid in the ink-jet ink composition reduces the pH differential required to render insoluble the pH-sensitive colorant of a second encroaching ink-jet ink composition, as described in related application Serial No. 08/567,974. The presence of the dual-function pH adjusting compound further increases the concentration of an acid functional group in the ink-jet ink composition while also increasing the pH of the ink-jet ink composition to acceptable levels. Therefore, the dual-function pH adjusting compound augments the bleed alleviation achieved by an organic acid alone according to the mechanism disclosed in Serial No. 08/567,974.

The addition of the pH adjusting compound is advantageous for several reasons. First and foremost, the bleed control achieved by practicing the invention disclosed in application Ser. No. 08/567,974 is further improved, as demonstrated by the Examples below. Second, the pH adjusting compound eliminates the need for a separate pH adjusting compound, such as the tetramethylammonium hydroxide (TMAOH) used in the related application. Further, the pH adjusting compound of the present invention eliminates the need for a buffer compound, such as tris [hydroxymethyl]aminomethane.

In addition to improving ink-jet print quality, the present pH adjusting compound is also cost-effective and, in the case of using an amino acid, is environmentally friendly.

By inducing the precipitation of the pH-sensitive colorant, migration of the colorant is inhibited, thereby helping to reduce bleed between different inks. Precipitation is induced by contacting the pH-sensitive colorant with the target ink having an appropriate pH. Whereas Shields et al '045 disclose a pH differential between the target ink and the pH-sensitive ink of about 4 to 5 units, a pH differential on the order of 3 units or even less is sufficient to substantially reduce bleed in the practice of the invention. Therefore, assuming the pH-sensitive ink has a pH of about 8, the pH of the target ink could be as high as 5 in the practice of the invention as opposed to a pH of about 3 in the absence of an organic acid component and acid functional group.

In sum, the incorporation of a pH adjusting organic compound having both at least one acid functional group and at least one basic functional group further improves the bleed control achieved in application Serial No. 08/567,974 in a cost-effective manner using a class of compounds that is commonly available and typically compatible with ink-jet ink compositions.

BEST MODES FOR CARRYING OUT THE INVENTION

The invention described herein is directed to improving the method of reducing bleed between adjacently-printed color inks disclosed in U.S. Pat. No. 5,181,045, hereinafter "Shields et al '045" as well as that disclosed in related application Ser. No. 08/567,974, entitled "Bleed Alleviation in Ink-Jet Inks Using Organic Acids".

Shields et al '045 discloses that bleed may be reduced between two adjacently-printed color ink-jet inks by formulating one ink to comprise a pH-sensitive dye and the other ink with an appropriate pH to cause the pH-sensitive dye to precipitate. Without subscribing to any particular theory, the inventors of Shields et al '045 suggest that by forming a dye to become insoluble on the page, the migration of the dye will be inhibited, such that bleed is reduced between colors. Thus, the method of Shields et al '045 involves providing a sufficient pH differential between two ink compositions such that the pH-sensitive dye in one ink precipitates and inhibits bleed.

Related application Serial No. 08/567,974 (hereinafter "the '974 application") improves upon the method of Shields et al '045. Specifically, the pH differential required in Shields et al '045 to completely control bleed is typically on the order of about 4 to 5 units. Thus, if the pH-sensitive ink has a pH on the order of 7 or 8, as is common among thermal ink-jet ink compositions, the adjacently-printed target ink composition would require a pH ranging from about 2 to 4 to completely inhibit bleed. Thus, the level of acidity required to control bleed becomes a concern, since the ink-jet ink compositions may actually become corrosive to the ink-jet printer parts. Moreover, this range of acidity may have adverse effects on certain other ink components. The '974 application reduces the pH differential required to achieve bleed control according to the basic tenets of Shields et al '045 by incorporating an organic acid into the "target" ink-jet ink composition.

Specifically, the '974 application discloses that an organic acid component should be added to the so-called target ink-jet ink composition, as opposed to the pH-sensitive ink composition. The organic acid component reduces the pH differential required to control bleed. Whereas the pH differential required to control bleed in Shields et al '045 without the assistance of an organic acid is on the order of 5 units in today's more demanding priming environment, the addition of an organic acid reduces the required pH differential to about 3 units, or even less. By incorporating an organic acid component in the target ink composition and maintaining its pH at about 3 units lower than that of the pH-sensitive ink, the encroachment of an adjacently-printed pH-sensitive colorant may be substantially halted. Therefore, while a pH of 3 or less is typically required to completely control bleed for present-day ink-jet printers using the method of Shields et al '045, the addition of an organic acid component to the target ink composition enables one to control bleed with a pH of at least about 4.

The presently described improvement of the invention disclosed in the '974 application involves the incorporation of a pH-adjusting component containing both at least one acidic functional group and at least one basic functional group. This pH-adjusting component serves two purposes: (1) it increases the concentration of the acidic functional group in the ink; and (2) it increases the pH of the ink to the desired level. Both the concentration of the acid functional group and the pH of the ink are essential factors in controlling bleed between ink-jet inks printed adjacently to one another. Thus, the use of an acid containing a basic functional group is unique in that both of the above criteria are met by the addition of a single compound.

Before specifically addressing the ink components, it should be noted that the purity of all components is that employed in normal commercial practice for ink-jet ink compositions. Weight percents represent percent of the total ink composition, unless otherwise indicated.

The organic acid component disclosed by the '974 application should be present in the target ink-jet ink composition at a concentration ranging from about 0.1 to 20 wt %. An organic acid concentration of less than about 0.1 wt % would be insufficient to effectively reduce the pH differential, while an organic acid concentration of more than about 20 wt % would affect the reliability of printhead operation. Preferably, the acid concentration is in the range of about 0.5 to 5 wt %.

Examples of organic acids that may be suitably employed in the practice of the invention include, but are not limited to, mono-, di-, and polyfunctional organic acids. In general, it is contemplated that any soluble organic acid having a pKa equal to or less than that of the pH-sensitive colorant of concern may be suitably employed. Further, in contrast to the pH adjusting organic compound, it is contemplated that the organic acid component will have no basic functional groups. Preferably, one of the following classes of organic acids is employed: polyacrylic, acetic, glycolic, malonic, malic, maleic, ascorbic, succinic, glutaric, fumaric, citric, tartaric, lactic, sulfonic, and ortho-phosphoric acid and derivatives thereof. The organic acid component may also comprise mixtures of appropriate organic acids. The particular acid employed depends upon the particular ink formulations. Glycolic acid is generally preferred for minimizing bleed, although any of the other organic acids may also be suitably employed in the practice of the invention. However, for commercial applications, succinic acid is preferred, as it is less susceptible to kogation on the firing resistor than glycolic acid. The pH adjusting component of the present invention is contemplated to totally replace the strong bases used to adjust pH in the '974 application. Specifically, the '974 application employed TMAOH to adjust the pH of the "target" ink-jet ink composition to about 4, thereby providing sufficient pH differential between that ink and the pH-sensitive ink-jet ink. The present pH adjusting component may likewise be used to adjust the pH of the target ink-jet ink to such levels, but advantageously also increases the concentration of acid functional groups to further alleviate bleed. Further, the availability of both a basic functional group and an acidic functional group in solution together allows for a type of "internal buffer" which may be able to in effect provide more protons than a typical conjugate acid/base pair upon contact with a pH-sensitive ink.

An example of a class of compounds having both acidic and basic functional groups that may be suitably employed in the practice of the invention includes, but is not limited to, amino acids. Genetically, amino acids are organic acids containing a basic amine group (—NRR') and an acidic carboxyl group (—COOH). In the amine functionality, R and R' are independently selected from the group consisting of H, $C_1$ to $C_6$ unsubstituted or substituted alkyl, and unsubstituted and substituted aryl. If substituted, a solubilizing group, such as —OH, is preferably employed. Preferably, the basic amine group is —$NH_2$.

In general, it is contemplated that any soluble organic acid having at least one basic functional group may be suitably employed, so long as it has a pKa equal to or less than that of the pH-sensitive colorant of concern. The pH adjusting organic compound has at least as many basic functional groups as acidic functional groups, and may have more basic functional groups than acidic functional groups.

The concentration of pH adjusting organic compound is in the same range as the organic acid, namely, about 0.1 to 20 wt %, and preferably about 0.5 to 5 wt %. However, the concentration of the two compounds is not necessarily the same.

Examples of amino acids that may be used in the practice of the invention include, but are not limited to, β-alanine, 4-aminobutyric acid, DL-alanine, glycine, threonine, and sarcosine. Additional examples of amino acids that may be used in the practice of the invention include those amino acids that are substantially soluble in the ink vehicle at the pH used, such as L-arginine, L-aspartic acid, L-cystine, diiodo-L-tyrosine, L-glutamic acid, L-histidine, hydroxy-L-proline, DL-isoleucine, DL-deucine, L-lysine, DL-methionine, DL-phenylalanine, L-proline, DL-serine, L-tryptophan, L-tyrosine, 6-aminocaproic acid, and DL-valine. The pH adjusting organic compound may also comprise mixtures of appropriate acids. The preferred acid employed as the pH adjusting compound depends upon the particular ink formulations. In general, β-alanine is the preferred pH adjusting component in the practice of the invention, although any of the other organic acids having a basic functional group may also be suitably employed in the practice of the invention.

While it is not mandatory that both the organic acid and the pH adjusting organic compound have the same functional acid group, it is preferred that both be the same, and more preferably, that both be carboxylic acid. The preferred combination of organic acid and pH adjusting organic compound includes (1) glycolic acid and β-alanine and (2) succinic acid and β-alanine.

An ink-jet ink composition employing an organic acid component and having an appropriate pH will, in accordance with the present invention, render insoluble a pH-sensitive colorant contained in an encroaching ink-jet ink composition. Further, by employing a pH adjusting organic component in accordance with the invention, rather than a strong base to adjust pH, one further enhances the bleed alleviation of the pH-sensitive ink. A pH-sensitive colorant is a colorant that becomes insoluble under specific and well-defined pH conditions. In the practice of the invention, the pH-sensitive colorant may be either a dye or a pigment. Examples of pH-sensitive dyes are carboxylated dyes, such as azo dyes, xanthene dyes, copper phthalocyanine dyes, and the like. Examples of inks with pigments that may be suitably employed in the practice of the invention include any pigment that is dispersed with a dispersant having a pH-sensitive functionality, for example, the Joncryl® polymers available from S. C. Johnson Polymer (Racine, Wis.). Other colorants exhibiting differential solubility with pH may also be employed in the practice of the invention.

The colorant employed in the so-called "target" ink composition likewise may be either a dye or a pigment, although it is contemplated that the target ink composition will be dye-based, employing any of the water-soluble dyes used in inks for ink-jet printers. Examples of such dyes include, but are not limited to, Food Black 2, Carta Black, Direct Black 19, Direct Black 51, Direct Black 109, Direct Black 154, Direct Blue 86, Direct Blue 199, Direct Red 9, Direct Red 32, Acid Yellow 23, Acid Blue 185, Acid Blue 9, Acid Red 17, Acid Red 52, Acid Red 249, and Reactive Red 180. The concentration of such a dye preferably ranges from about 0.1 to 7 wt %. Less than about 0.1 wt % results in an ink of unacceptable lightness, while greater than about 7 wt % results in clogging of the orifices in the ink-jet pen. More preferably, the dye is present within the range of about 0.1 to 4 wt % of the ink-jet ink composition. A mixture of dyes may also be employed.

The vehicles of the pH-sensitive ink and the so-called target ink may comprise such vehicle components found in commercial practice as are compatible with their respective colorants. For a target dye-based color ink, the vehicle preferably comprises, in addition to the organic acid component and the pH adjusting component, at least one diol, 2-pyrrolidone, "other" components such as surfactants and biocides, and water. More specifically, the vehicle of a target dye-based color ink preferably comprises the following concentrations, expressed as a percentage of total ink composition: (a) about 3 to 20 wt % of at least one diol; (b) about 3 to 9 wt % of 2-pyrrolidone; (c) up to about 4 wt % of a surfactant; (d) about 0.1 to 20 wt % of at least one organic acid; (e) about 0.1 to 20 wt % of the pH adjusting organic component; and (f) the balance water. While the above-described vehicle formulation is preferred, any aqueous-based vehicle suitable for ink-jet ink compositions may be benefited in the practice of the invention.

Examples of diols that may be employed in the ink vehicle include any of, or a mixture of two or more of, such compounds as ethanediols (e.g., 1,2-ethanediol); propanediols (e.g., 1,2-propanediol, 1,3-propanediol, 2-ethyl-2-hydroxymethyl-1,3-propanediol, ethylhydroxypropanediol (EHPD), etc.); butanediols (e.g., 1,3-butanediol, 1,4-butanediol, etc.); pentanediols (e.g. 1,5-pentanediol); and hexanediols (e.g., 1,6-hexanediol, 2,5-hexanediol, etc.). Preferably 1,5-pentanediol and EHPD are employed in the ink vehicle.

In addition, up to about 5 wt % of at least glycol ether may be added to the vehicle. Any of the glycol ethers and thioglycol ethers may be employed that are commonly employed in ink-jet ink compositions. Examples of such compounds include polyalkylene glycols such as polyethylene glycols (e.g., diethylene glycol, triethylene glycol, tetraethylene glycol, etc.); propylene glycols (e.g., dipropylene glycol, tripropylene glycol, tetrapropylene glycol, etc.); polymeric glycols (e.g., PEG 200, PEG 300, PEG 400, PPG 400, etc.); and thioglycol. Diethylene glycol is the preferred glycol ether.

Other components that may be employed in the present ink vehicle include surfactants, biocides, and the like, each of which are commonly employed additives in ink-jet printing.

With particular regard to the surfactant component, one well-known purpose of a surfactant is to prevent color to color bleed by increasing the penetration of the inks into the print medium. Surfactants may also be employed to create a substantially uniform surface energy in the ink, thereby reducing the occurrence of mis-directed drops due to puddling of ink on the nozzle plate. Examples of classes of surfactants that are preferably employed in the present ink compositions include anionic surfactants and nonionic surfactants.

Consistent with the requirements for this invention, various other types of additives may be employed in the ink to optimize the properties of the ink composition for specific applications. For example, as is well known to those skilled in the art, one or more biocides, fungicides, and/or slimicides (microbial agents) may be used in the ink composition as is commonly practiced in the art. Examples of suitably employed microbial agents include, but are not limited to, NUOSEPT (Nudex, Inc.), UCARCIDE (Union Carbide), VANCIDE (KT Vanderbilt Co.), and PROXEL (ICI America). Additionally, sequestering agents such as EDTA may be included to eliminate deleterious effects of heavy metal impurities.

An example of a so-called "target" ink-jet ink composition that is formulated in accordance with the invention to include an organic acid and to exhibit a pH of about 4 is the following yellow dye-based ink: (a) about 0.12 absorbance Direct Yellow 132 associated with sodium cations; (b) 8 wt % 1,5-pentanediol, (c) about 7.5 wt % EHPD; (d) about 7.5 wt % 2-pyrrolidone; (e) about 1.75 wt % nonionic surfactant; (f) about 5.0 wt % citric acid; (g) about 4 wt % β-alanine to buffer the pH of the ink solution to about 4; and (h) the balance water.

An example of a black ink-jet ink composition that contains a pH-sensitive dye has a formulation given by: (a) about 2.2 wt % of a black carboxylated dye, such as Black 286 dye and Black 287 dye which are similar to the dyes disclosed in U.S. Pat. No. 4,963,189, issued to Suraj L. Hindagolla and assigned to the same assignee as the present invention; (b) about 7.5 wt % 2-pyrrolidone; (c) about 0.2 wt % tris(hydroxymethyl)-aminomethane; (d) about 0.06 wt % ethylenediaminetetraacetic acid (EDTA) in free acid form; (e) about 0.2 wt % ammonium dihydrogen phosphate; (f) about 0.0075 wt % Voranol 3010 polyol; (g) about 0.3 wt % Proxel GXL; and (h) the balance water. This black ink is commonly formulated to have a pH of about 8.5, with the dye in this ink known to come out of solution as the pH drops to about 6.5. If this black ink is printed adjacent the above-described yellow ink on a print medium, the pH differential therebetween would be sufficient to precipitate the pH-sensitive dye in the black ink and to therefore prevent bleed from the black ink to the color ink, even in the more demanding present-day ink-jet printers.

Another example of a "target" ink-jet ink composition comprises the following yellow dye-based ink: 0.9% absorbance Direct Yellow 132 (associated with sodium cations); (b) 8 wt % 1,5-pentanediol; (c) 7.5 wt % EHPD; (d) 1 wt % Dowfax 8390 (a surfactant); (e) 5 wt % succinic acid; (f) 7.5 wt % 2-pyrrolidone; (g) 1.5 wt % Tergitol 15-S-5 (a surfactant); (h) about 1.5 wt % β-alanine; and (I) the balance water. Absorbance is measured of an aqueous solution of the dye at a dilution of 1:10,000. This ink printed adjacent a pH-sensitive pigmented black ink containing dispersed carbon black causes the black pigment to precipitate and prevent bleed from the black ink to the color ink.

Regarding the use of a buffer in the ink-jet ink compositions, it is important to note that the buffer capacity must not be so high as to overwhelm the effects of the lower pH ink. In practice, the bleed control effect can work when the ink containing the pH-sensitive colorant contains a buffer, such as tris[hydroxymethyl]aminomethane or a phosphate or borate buffer.

While the method of the present invention may be employed to reduce or eliminate bleed between any two ink-jet inks, it is expected to find greatest use in preventing black to color bleed and color to color bleed, since color to black bleed is virtually unnoticeable. Therefore, it is contemplated that the invention will be practiced such that the black ink in an ink set is formulated to contain a pH-sensitive colorant while the color inks will be formulated to contain an organic acid and a pH adjusting component, in accordance with the invention, and to exhibit a pH that differs from the pH of the black ink in accordance with the present invention. It follows that black to color bleed will have been substantially eliminated in such an ink set.

In sum, the present method involves modification of two ink formulations to bring about the desired effect of bleed control therebetween. The pH-sensitive colorant is incorporated into the ink-jet ink composition having the tendency to bleed into adjacent inks (or the ink yielding the most visible signs of bleed), whereas two acids are incorporated into the ink-jet ink composition whose borders might otherwise have been sullied (e.g., the "target" ink), with one acid being an organic acid having no basic functional groups and the other acid (the pH adjusting organic compound) having at least one basic functional group. By maintaining a pH differential on the order of 3 to 5 units, or even less for more sensitive colorants, bleed by the pH-sensitive ink into the target ink will have been substantially eliminated. While the specific examples herein employ only dye-based color inks as target inks, it is noted that both the pH-sensitive ink and the target ink may be either dye-based or pigment-based in the practice of the invention.

The advantages realized in the practice of the invention are illustrated in the examples below.

EXAMPLES

The Figures illustrate the efficacy of the combination of (1) an organic acid without a basic functional group and a (2) pH adjusting component having both at least one acidic functional group and at least one basic functional group as precipitants. A comparison is done between the amount of bleed occurring in the practice of the invention versus that occurring when an organic acid having no basic functional group is employed using a strong base as a pH adjuster, rather than the pH adjusting organic component of the present invention having both acid functional group(s) and basic functional group(s).

To perform these examples, a DeskJet® printer was modified such that it could carry two pens. One of these pens was a tri-chamber pen and the other was a single-chamber pen. There is no reason why both pen positions could not be occupied by tri-chamber pens or both by single-chamber pens; however, for this implementational, a pen of each type was used in the two pen position. The tri-chamber pen was employed to print color (e.g., yellow) ink while the single-chamber pen was employed to print black ink for evaluation of black to color bleed. While any combination of color and black inks might have been used to illustrate the benefits of practicing the invention, yellow and black inks were employed for their contrast so that bleed would be readily observable. The yellow and black inks were printed onto either Champion Datacopy paper or Modo Datacopy paper, as indicated for each example.

Figure 1A:
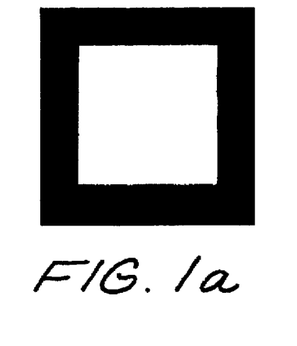
FIG. 1A is a line drawing illustrating the bleed control achieved in the practice of the invention when a yellow ink containing 5 wt % citric acid and employing alanine as a pH-adjuster is cross-hatched with a black ink containing a pH-sensitive dye, the inks having been printed on Champion Datacopy paper.
Figure 1B:
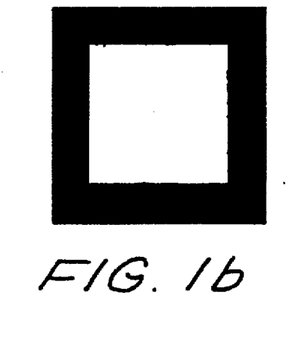
FIG. 1B is a line drawing illustrating the poorer degree of bleed control when a yellow ink containing 5 wt % citric acid is formulated outside the scope of the invention, i.e., formulated with tetramethylammonium hydroxide as the pH adjuster, and is cross-hatched with a black ink containing a pH-sensitive dye, the inks having been printed on Champion Datacopy paper.

FIGS. 1A and 1B compare the bleed control achieved in the practice of the invention with that achieved in the absence of a pH adjusting organic compound having both acid functional groups and basic functional groups, respectively. Both Figures depict an area fill of yellow ink (represented as the white area in the Figures) printed onto Champion Datacopy paper and cross-hatched by black ink, which contained a pH-sensitive colorant. The yellow inks represent the so-called "target" inks and each employed 5 wt % citric acid as a precipitant. However, whereas the yellow ink of FIG. 1A employed β-alanine as a pH adjuster, the yellow ink of FIG. 1B employed a conventional strong base, namely, tetramethylammonium hydroxide. Specifically, the composition of the yellow inks is provided in Table 1 below:

TABLE 1

Yellow Ink Formulations of FIGS. 1A and 1B
(All values are weight percent unless otherwise indicated.)

| Component | Yellow Ink of FIG. 1A | Yellow Ink of FIG. 1B |
| --- | --- | --- |
| dye | 0.12 abs DY 132-Na[1] | 0.12 abs DY 132-Na[1] |
| 1,5-pentanediol | 8 | 8 |
| EHPD | 7.5 | 7.5 |
| 2-pyrrolidone | 7.5 | 7.5 |
| citric acid | 5 | 5 |
| β-alanine | 4 | — |
| TMAOH | — | 4 |
| Tergitol 15-S-7 | 1.75 | 1.75 |
| water | bal. | bal. |
| pH | 4 | 4 |

[1]Direct Yellow 132, absorbance measured at a dilution of 1:10,000 in water.

In all of the figures, the black ink had the following formulation: (a) 3.75 wt % carbon black; (b) 7 wt % 2-pyrrolidone; (c) 0.4 wt % neo-pentyl alcohol; (d) 5.5 wt % LEG-1 (an ethoxylated glycol available from Liponics); (e) 2 wt % LEG-7; (f) 0.1 wt % dodecanol; (g) 0.15 wt % Surfynol 465, (h) 0.3 wt % Proxel GXL; and (i) the balance water. This black ink had a pH of about 8.5.

A comparison of FIGS. 1A and 1B readily illustrates that bleed control is enhanced with the incorporation of the amino acid β-alanine as a pH-adjuster rather than tetramethylammonium hydroxide. Specifically, the border between the yellow and black inks is cleaner and less ragged in FIG. 1A than in FIG. 1B.

Figure 2A:
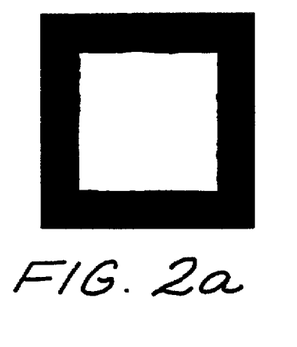
FIGS. 2A AND 2B are line drawings illustrating the bleed control achieved with the ink combinations of FIGS. 1A and 1B as printed on Modo Datacopy paper, respectively.
Figure 2B:
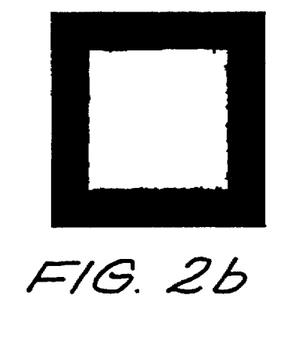

To illustrate the effects of printing on a different paper, the same inks were printed on Modo Datacopy paper as FIGS. 2A and 2B. Bleed is paper-dependent, and Modo Datacopy tends to bleed more than Champion Datacopy paper. However, as illustrated by the better bleed control of FIG. 2A compared to FIG. 2B, the use of a pH adjusting compound containing both acidic functional groups and basic functional groups in the place of a strong base is seen to reduce bleed on both papers.

Figure 3A:
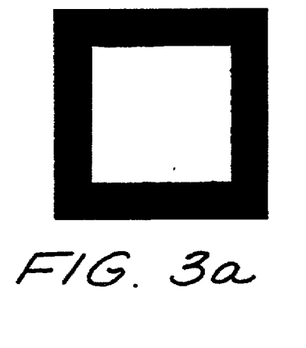
FIG. 3A is a line drawing illustrating the bleed control achieved in the practice of the invention when a yellow ink containing 5.2 wt % diglycolic acid and employing β-alanine as a pH-adjuster is cross-hatched with a black ink containing a pH-sensitive dye, the inks having been printed on Champion Datacopy paper.
Figure 3B:
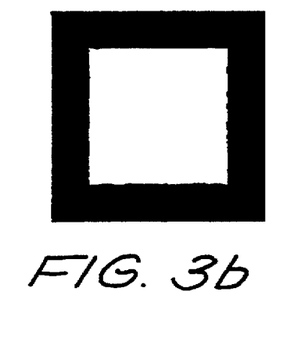
FIG. 3B is a line drawing illustrating the poorer degree of bleed control when a yellow ink containing 5.2 wt % diglycolic acid is formulated outside the scope of the invention, i.e., formulated with tetramethylammonium hydroxide as the pH adjuster, and is cross-hatched with a black ink containing a pH-sensitive dye, the ink having been printed on Champion Datacopy paper.

Like FIGS. 1A and 1B, FIGS. 3A and 3B compare the bleed control achieved in the practice of the invention with that achieved in the absence of a pH adjusting compound having both acid and basic functional groups. FIGS. 3A and 3B likewise depict an area fill of yellow ink (represented as the white area in the figures) printed onto Champion Datacopy paper and cross-hatched by black ink. The yellow inks of this example each employed 5.2 wt % diglycolic acid as a precipitant, with the yellow ink of FIG. 3A employing β-alanine as a pH adjuster versus the tetramethylammonium hydroxide employed in the yellow ink of FIG. 3B. Specifically, the composition of the yellow inks is provided in Table 2 below:

TABLE 2

Yellow Ink Formulations of FIGS. 3A and 3B
(All values are weight percent unless otherwise indicated.)

| Component | Yellow Ink of FIG. 3A | Yellow Ink of FIG. 3B |
| --- | --- | --- |
| dye | 0.12 abs DY 132-Na[1] | 0.12 abs DY 132-Na[1] |
| 1,5-pentanediol | 8 | 8 |
| EHPD | 7.5 | 7.5 |
| 2-pyrrolidone | 7.5 | 7.5 |
| diglycolic acid | 5.2 | 5.2 |
| β-alanine | 12 | — |
| TMAOH | — | 9.3 |
| water | bal | bal. |
| pH | 4 | 4 |

[1]Direct Yellow 132, absorbance measured at a dilution of 1:10,000 in water.

A comparison of FIGS. 3A and 3B readily illustrates that bleed control is enhanced with the incorporation of the amino acid as a pH-adjuster rather than tetramethylammonium hydroxide. Specifically, the border between the yellow and black inks is cleaner and less ragged in FIG. 3A than in FIG. 3B.

Figure 4A:
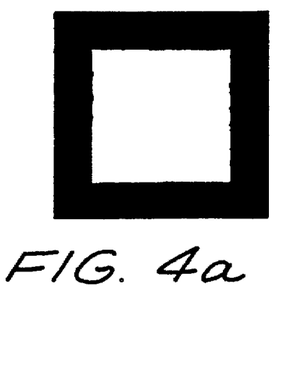
FIGS. 4A AND 4B are line drawings illustrating the bleed control achieved with the ink combinations of FIGS. 3A and 3B as printed on Modo Datacopy paper, respectively.
Figure 4B:
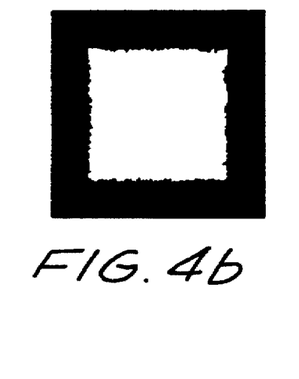

To illustrate the effects of printing on a different paper, the same inks of FIGS. 3A and 3B were printed on Modo Datacopy paper. As illustrated by the better bleed control of FIG. 4A compared to FIG. 4B, the use of the pH adjusting organic compound containing both acidic functional groups and basic functional groups in the place of a strong base is seen to reduce bleed on both papers.

Thus, it has been demonstrated that the use of a pH adjusting organic compound having both at least one acidic functional group and at least one basic functional group, in addition to a soluble organic acid per the '974 application, results in enhanced bleed alleviation compared to the use of a strong base as a pH adjuster.

INDUSTRIAL APPLICABILITY

The present method and ink composition disclosed herein for controlling bleed between adjacently-printed inks are expected to find commercial use in thermal ink-jet color printing.

Thus, there has been disclosed herein an ink-jet ink composition including both (1) an organic acid having no basic functional group and (2) a pH-adjuster containing both at least one acidic functional group and at least one basic functional group for the purpose of reaping the bleed control benefits derived from the increased concentration of an organic acid functional group while neutralizing the pH of the ink to desirable levels. Additionally, a method for reducing bleed by employing the same ink-jet ink composition is disclosed. It will be readily apparent to those skilled in the art that various changes and modifications of an obvious nature may be made without departing from the spirit of the invention, and all such changes and modifications are considered to fall within the scope of the invention as defined by the appended claims.

What is claimed is:

1. A first ink-jet ink composition for thermal ink-jet priming, said first ink-jet ink composition having a pH such that a pH differential exists between said first ink-jet ink composition and a second ink-jet ink composition, said second ink-jet ink composition having a pH-sensitive colorant, said pH differential being sufficient to effect precipitation of said pH-sensitive colorant upon contact of said second ink-jet ink composition with said first ink-jet ink composition, such that bleed of said second ink-jet ink composition into said first ink-jet ink composition is substantially reduced in the event said first and second ink-jet ink compositions are adjacently printed on a print medium, said first ink-jet ink composition including 0.1 to 20 wt % of at least one organic acid having no basic functional group and 0.1 to 20 wt % of at least one pH-adjusting compound containing both at least one acidic functional group and at least one basic functional group, said at least one pH-adjusting organic compound present in sufficient amount in said first ink-jet ink composition to effectuate said pH, wherein the pH differential required to effect a reduction in bleed of said second ink-jet ink composition into said first ink-jet ink composition is reduced by the presence of said at least one organic acid and said acidic functional group in said first ink-jet ink composition.

2. The first ink-jet ink composition of claim 1 wherein said at least one organic acid is present in said first ink-jet ink composition at a concentration ranging from about 0.5 to 5 wt %.

3. The first ink-jet ink composition of claim 1 wherein said at least one organic acid is selected from the group consisting of monofunctional organic acids, difunctional organic acids, and polyfunctional organic acids.

4. The first ink-jet ink composition of claim 3 wherein said at least one organic acid is selected from the group consisting of polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, and ortho-phosphoric acid and derivatives thereof.

5. The first ink-jet ink composition of claim 1 wherein said pH differential ranges from about 3 to 5 units.

6. The first ink-jet ink composition of claim 5 wherein said pH differential is about 4 units.

7. The first ink-jet ink composition of claim 1 wherein said acid functional group consists essentially of a carboxyl group.

8. The first ink-jet ink composition of claim 1 wherein said basic functional group is an amine group, given by —NRR', where R and R' are independently selected from the group consisting of H, unsubstituted and substituted $C_1$ to $C_6$ alkyl, and unsubstituted and substituted aryl.

9. The first ink-jet ink composition of claim 1 wherein said pH adjusting organic compound is an amino acid.

10. The first ink-jet ink composition of claim 9 wherein said amino acid is selected from the group consisting of β-alanine, 4-aminobutyric acid, DL-alanine, glycine, threonine, and sarcosine.

11. The first ink-jet ink composition of claim 1 wherein said pH adjusting organic compound is present in said first ink-jet ink composition at a concentration ranging from about 0.5 to 5 wt %.

12. The first ink-jet ink composition of claim 6 wherein said pH of said first ink-jet ink composition is at least about 4 and wherein said pH is lower than the pH of said second ink-jet ink composition.

13. The first ink-jet ink composition of claim 1 wherein said pH-sensitive colorant comprises a colorant selected from the group consisting of carboxylated azo dyes, carboxylated copper phthalocyanine dyes, carboxylated xanthene dyes, dyes whose solubilities decrease as pH is lowered, and pigments dispersed with a dispersant having a pH-sensitive functionality.

14. The first ink-jet ink composition of claim 1 wherein said second ink-jet ink composition comprises a pH-sensitive colorant and a vehicle and wherein said first ink-jet ink composition comprises (a) about 0.1 to 4 wt % of at least one dye, (b) about 3 to 20 wt % of at least one diol, (c) about 3 to 9 wt % 2-pyrrolidone, (d) up to about 4 wt % surfactant, (e) about 0.1 to 20 wt % of at least one organic acid, (f) about 0.1 to 20 wt % of at least one pH adjusting organic compound having at least one acidic functional group and at least one basic functional group to achieve said pH, and (g) the balance water.

15. A method of reducing the bleed in printing at least two different color inks onto a print medium from an ink-jet pen, said at least two different color inks comprising a first ink-jet ink composition and a second ink-jet ink composition having a pH-sensitive colorant and a measurable pH, said method comprising the steps of:

(a) formulating said first ink-jet ink composition to include at least one organic acid; and (b) formulating said first ink-jet ink composition to include at least one pH-adjusting organic compound containing both at least one acidic functional group and at least one basic functional group, said at least one pH-adjusting compound present in sufficient amount in said first ink-jet ink composition to effectuate a pH such that a sufficient pH differential exists between said first ink-jet ink composition and said second ink-jet ink composition such that said pH-sensitive colorant precipitates in the event it is contacted by said first ink-jet ink composition, wherein the pH differential required to effect a substantial reduction in bleed of said second ink-jet ink composition into said first ink-jet ink composition is reduced by the presence of said organic acid and said pH adjusting organic compound in said first ink-jet ink composition.

16. The method of claim 15 wherein said at least one organic acid is present in said first ink-jet ink composition at a concentration ranging from about 0.5 to 20 wt %.

17. The method of claim 16 wherein said at least one organic acid is selected from the group consisting of monofunctional organic acids, difunctional organic acids, and polyfunctional organic acids.

18. The method of claim 17 wherein said at least one organic acid is selected from the group consisting of polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, and ortho-phosphoric acid and derivatives thereof.

19. The method of claim 15 wherein said pH differential ranges from about 3 to 5 units.

20. The method of claim 15 wherein said acid functional group consists essentially of a carboxyl group.

21. The method of claim 15 wherein said basic functional group is an amine group, given by —NRR', where R and R' are independently selected from the group consisting of H, unsubstituted and substituted $C_1$ to $C_6$ alkyl, and unsubstituted and substituted aryl.

22. The method of claim 15 wherein said pH adjusting organic compound is an amino acid.

23. The method of claim 22 wherein said amino acid is selected from the group consisting of β-alanine, 4-aminobutyric acid, DL-alanine, glycine, threonine, and sarcosine.

24. The method of claim 15 wherein said pH adjusting compound is present in said first ink-jet ink composition at a concentration ranging from about 0.1 to 20 wt %.

25. The method of claim 19 wherein said pH of said first ink-jet ink composition is at least about 4 and wherein said pH is lower than the pH of said second ink-jet ink composition.

26. The method of claim 15 wherein said pH-sensitive colorant comprises a colorant selected from the group consisting of carboxylated azo dyes, carboxylated copper phthalocyanine dyes, carboxylated xanthene dyes, dyes whose solubilities decrease as pH is lowered, and pigments dispersed with a dispersant having a pH-sensitive functionality.

27. The method of claim 15 wherein said second ink-jet ink composition comprises a pH-sensitive colorant and a vehicle and wherein said first ink-jet ink composition comprises (a) about 0.1 to 4 wt % of at least one dye, (b) about 3 to 20 wt % of at least one diol, (c) about 3 to 9 wt % 2-pyrrolidone, (d) up to about 4 wt % surfactant, (e) about 0.1 to 20 wt % of at least one organic acid, (f) 0.1 to 20 wt % of said pH adjusting organic compound to achieve said predetermined pH, and (g) the balance water.

* * * * *

UNITED STATES PATENT AND TRADEMARK OFFICE
CERTIFICATE OF CORRECTION

PATENT NO.    : 5,679,143
DATED         : October 21, 1997
INVENTOR(S)   : Steven D. Looman It is certified that error appears in the above-identified patent and that said Letters Patent is hereby corrected as shown below:

Column 12,
Line 58, "priming" should read -- printing --.

Signed and Sealed this

Sixth Day of May, 2003

JAMES E. ROGAN
*Director of the United States Patent and Trademark Office*